(12) United States Patent
Homchaudhuri et al.

(10) Patent No.: US 9,161,330 B2
(45) Date of Patent: Oct. 13, 2015

(54) METHOD OF ENABLING SINGLE CHAIN RANGING OPERATIONS

(71) Applicant: QUALCOMM Incorporated, San Diego, CA (US)

(72) Inventors: Sandip Homchaudhuri, San Jose, CA (US); Carlos Horacio Aldana, Mountain View, CA (US); Xiaoxin Zhang, Sunnyvale, CA (US); James Simon Cho, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 13/970,382

(22) Filed: Aug. 19, 2013

(65) Prior Publication Data

US 2015/0049679 A1    Feb. 19, 2015

(51) Int. Cl.
*H04L 1/00*    (2006.01)
*H04W 64/00*   (2009.01)

(52) U.S. Cl.
CPC .................................... *H04W 64/00* (2013.01)

(58) Field of Classification Search
CPC ......... H04L 47/10; H04L 47/11; H04L 47/12; H04L 47/13; H04L 47/70; H04L 47/2441
USPC .......................... 370/229, 230, 340, 341, 329
See application file for complete search history.

(56) References Cited

U.S. PATENT DOCUMENTS

| 6,215,792 | B1 | 4/2001 | Abi-Nassif |
| 8,009,752 | B2 | 8/2011 | Casaccia et al. |
| 8,391,249 | B2 | 3/2013 | Odenwalder et al. |
| 2005/0282548 | A1* | 12/2005 | Kim et al. ..................... 455/436 |

FOREIGN PATENT DOCUMENTS

| EP | 1784044 A1 | 5/2007 |
| WO | 2006039635 A2 | 4/2006 |

OTHER PUBLICATIONS

Kim J.H., "Quality of Service and Channel-Aware Packet Bundling for Capacity Improvement in Cellular Networks," 2011, 97 pages.

* cited by examiner

*Primary Examiner* — Dady Chery
(74) *Attorney, Agent, or Firm* — Mahamedi Paradice LLP

(57) ABSTRACT

A system and method are disclosed for performing ranging operations between two wireless devices without employing cyclic shift diversity (CSD) compensation techniques. For some embodiments, a first wireless device sends a negotiation request frame requesting the second wireless device to respond to subsequently received frames of a specified type using a selected one of the transmit chains in the second wireless device. Thereafter, the first wireless device sends a data frame to the second wireless device to initiate a ranging operation. The second wireless device sends a response frame of the specified type to the first wireless device using the selected one of the transmit chains.

47 Claims, 5 Drawing Sheets

METHOD OF ENABLING SINGLE CHAIN RANGING OPERATIONS

TECHNICAL FIELD

The present embodiments relate generally to wireless networks, and specifically to ranging operations performed between Wi-Fi enabled devices.

BACKGROUND OF RELATED ART

The recent proliferation of Wi-Fi access points in wireless local area networks (WLANs) has made it possible for positioning systems to use these access points for position determination, especially in areas where there is a large concentration of active Wi-Fi access points (e.g., urban cores, shopping centers, office buildings, and so on). For example, a client device or station (STA) such as a cell phone or tablet computer can use the round trip time (RTT) of signals transmitted to and from the access points (APs) to calculate the distances between the STA and the APs. Once the distances between the STA and three APs are calculated, the location of the STA can be estimated using trilateration techniques. Similarly, the distance between a pair of STAs may also be calculated using the RTT of signals transmitted between the STAs, and thereafter trilateration techniques may be used to determine and/or verify the locations of the STAs.

For example, referring to FIG. 1, the distance (d) between an access point (AP) and a mobile station (STA) may be calculated as $d = c \cdot t_p/2 = c \cdot (RTT-TAT)/2$, where c is the speed of light, $t_p$ is the summation of the actual signal propagation times of a request (REQ) frame and an acknowledgement (ACK) frame exchanged between the AP and the STA, and TAT is the turn-around time (or processing delay) corresponding to the time delay between the STA receiving the REQ frame from the AP and beginning its transmission of the ACK frame to back the AP. The value of RTT may be measured by the AP as the difference between (1) the time of departure (TOD) of the REQ frame from the AP and (2) the time of arrival (TOA) of the ACK frame at the AP. The value of TAT is typically estimated.

Multiple input-multiple output (MIMO) technology may increase data throughput by allowing wireless devices (e.g., APs and STAs) to transmit data using multiple transmit chains and antennas. For MIMO devices, cyclic shift diversity (CSD) may be introduced between the transmit chains to prevent beam-forming by the multiple antennas. However, when performing ranging operations between wireless devices, phase delays associated with the CSD introduced between the transmit chains in the STA may result in errors associated with the measured TOA values of received signals. For example, referring again to FIG. 1, if the STA uses multiple transmit chains to send the ACK frame to the AP, then the CSD between the multiple transmit chains in the STA may result in different TOA values measured by the AP. A number of post processing operations may be used to compensate for the different TOA values resulting from CSD introduced by the STA when transmitting the ACK frame using multiple transmit chains. In addition to consuming power and processing resources, these post processing operations may not accurately compensate for CSD.

Thus, there is a need to increase the accuracy of RTT ranging operations performed between two wireless devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

In accordance with the present embodiments, post processing operations that compensate for CSD during ranging operations between two wireless devices may be avoided by using a single transmit chain in one or both of the wireless devices. For example, using a single transmit chain to send a frame from the second wireless device to the first wireless device may (1) ensure that only one version of the frame is transmitted from the second wireless device and (2) ensure that CSD is not introduced in the second wireless device when transmitting the frame to the first wireless device. As a result, the TOA of the frame (as measured by the first wireless device) may not be influenced by CSD associated with the second wireless device.

More specifically, for some embodiments, a method of performing a ranging operation between the first wireless device and the second wireless device may include receiving a negotiation request frame from the first wireless device, wherein the negotiation request frame includes a request for the second wireless device to respond to subsequent frames sent from the first wireless device using a selected one of the transmit chains in the second wireless device; sending a negotiation response frame from the second wireless device to the first wireless device, wherein the negotiation response frame indicates whether the second wireless device accepts the request; receiving a data frame from the first wireless device; and sending a response frame to the first wireless device in response to receiving the data frame. For some embodiments, the response frame is to be transmitted using the selected one of the transmit chains in the second wireless device if the response frame is of a specified frame type, and the response frame is to be transmitted using any number of the transmit chains in the second wireless device if the response frame is not of the specified frame type. The request may identify the specified frame type, may identify the selected one of the transmit chains to be used by the second wireless device, and/or may indicate a time duration or a number of frames of the specified type that are to be sent by the second wireless device.

For some embodiments, the negotiation request frame may include one or more reserved bits that indicate the request (and may also identify the selected transmit chain, the time duration, and/or the number of frames of the specified type that are to be sent by the second wireless device), and the negotiation response frame may include one or more reserved bits that indicate acceptance of the request. For example, for at least one embodiment, the second wireless device may assert the reserved bit in the negotiation response frame if the second wireless device accepts the request, and may de-assert the reserved bit in the negotiation response frame if the second wireless device does not accept the request. If the second wireless device accepts the request, the first wireless device may calculate a round trip time (RTT) value of subsequent data frame(s) and response frame(s) without employing a cyclic shift diversity (CSD) compensation operation (e.g., because the second wireless device uses a single transmit chain to send the response frame to the first wireless device). Conversely, if the second wireless device does not accept the request, the first wireless device may calculate the RTT value of subsequent data frame(s) and response frame(s) by employing the CSD compensation operation (e.g., because the second wireless device may use multiple transmit chains to send the response frame to the first wireless device).

If the second wireless device accepts the request to send frames of the specified type to the first wireless device using only one of its transmit chains, the second wireless device may continue to transmit such frames using only one transmit chain for a predetermined period of time, until one or more conditions are met, until the request is canceled, and/or for other suitable reasons. For one example, the second wireless device may send subsequent frames of the specified type to the first wireless device using only one transmit chain for a predetermined time period after receiving (or after accepting) the request. For another example, the second wireless device may send a predetermined number of subsequent frames of the specified type to the first wireless device using only one transmit chain. For still another example, the second wireless device may send subsequent frames of the specified type to the first wireless device using only one transmit chain until the second wireless device receives an instruction canceling the request.

The negotiation request frame may be any suitable frame such as, for example, a new REQUEST Action frame or an overloaded existing HT/VHT Operational Mode Action frame transmitted according to the IEEE 802.11 standards. The negotiation response frame may be any suitable frame such as, for example, a new RESPONSE Action frame or an overloaded existing HT/VHT Operational Mode Action frame, transmitted according to the IEEE 802.11 standards. For some embodiments, the request for the second wireless device to transmit data using a specified single transmit chain may apply only to ACK and block-ACK frames (e.g., frames of the specified type) to be transmitted from the second wireless device; other frames (e.g., data frames) may be transmitted from the second wireless device using multiple transmit chains even while the request from the first wireless device is valid.

BRIEF DESCRIPTION OF THE DRAWINGS

The present embodiments are illustrated by way of example and are not intended to be limited by the figures of the accompanying drawings.

Like numbers reference like elements throughout the drawings and specification.

DETAILED DESCRIPTION

The present embodiments are described below in the context of ranging operations performed by and between Wi-Fi enabled wireless devices for simplicity only. It is to be understood that the present embodiments are equally applicable for performing ranging operations using signals of other various wireless standards or protocols. As used herein, the terms WLAN and Wi-Fi can include communications governed by the IEEE 802.11 standards, Bluetooth®, HiperLAN (a set of wireless standards, comparable to the IEEE 802.11 standards, used primarily in Europe), and other technologies having relatively short radio propagation range.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
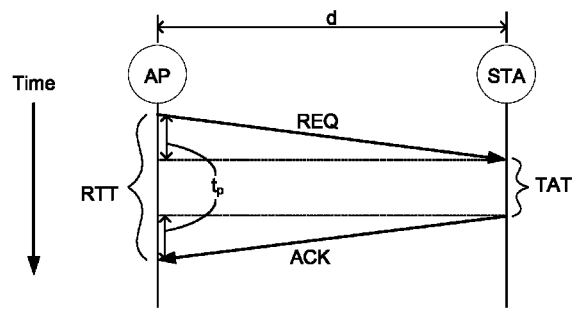
FIG. 1 is a sequence diagram depicting a conventional RTT ranging operation.
Figure 2:
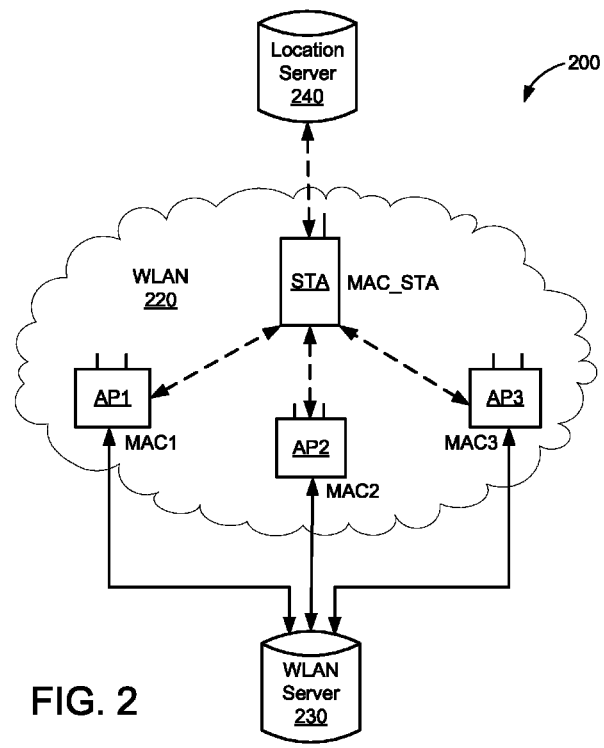
FIG. 2 is a block diagram of a WLAN positioning system within which the present embodiments may be implemented.

FIG. 2 is a block diagram of a wireless positioning system 200 in accordance with the present embodiments. The system 200 is shown to include a wireless STA, a wireless local area network (WLAN) 220, a WLAN server 230, and an access point location server (APLS) 240. The WLAN 220 is formed by a plurality of Wi-Fi access points (APs) that may operate according to the IEEE 802.11 family of standards (or according to other suitable wireless protocols). Although only three access points AP1-AP3 are shown in FIG. 2 for simplicity, it is to be understood that WLAN 220 can be formed by any number of access points. Each of access points AP1-AP3 is assigned a unique MAC address (i.e., MAC1-MAC3, respectively) that is programmed therein by, for example, the manufacturer of the access point. Similarly, the STA is also assigned a unique MAC address (MAC_STA). Each MAC address, which may be commonly referred to as the "burned-in address," the organizationally unique identifier (OUI), or the BSSID, in one embodiment includes six bytes (and thus 12 nibbles) of data. The first 3 bytes of the MAC address may identify which organization manufactured the device, and may be assigned to such organizations by the Institute of Electrical and Electronic Engineers (IEEE). The second 3 bytes of the MAC address, which may be referred to as the network interface controller (NIC) specific bytes, may be used to uniquely identify the individual device.

The WLAN server 230, which is coupled to AP1-AP3 over wired and/or wireless connections to control the operation of the APs, may instruct any of its associated APs to initiate ranging operations with the STA (e.g., to determine or verify the location of the STA). The WLAN server 230 may also use ranging information provided by the STA and/or AP1-AP3 to perform trilateration operations to determine the position of the STA and/or AP1-AP3. For some embodiments, the WLAN server 230 may instruct one or more STAs and/or AP1-AP3 to selectively use single transmit chain when sending frames during ranging operations.

The APLS 240, which may be accessible by the STA and/or the WLAN server 230, includes a database that stores the MAC addresses and location coordinates of a plurality of deployed access points (e.g., not just access points AP1-AP3 of FIG. 2). The database (not shown for simplicity) associated with the APLS 240 may be provided by companies such as Google, Skyhook, Devicescape, and/or WiGLE. The APLS 240 may also store other information associated with the access points including, for example, the accuracy of the location coordinates of each access point, the last location update for each access point, the last time each access point was visible, the protocol version of each access point, and so on. For some embodiments, selected portions of the APLS 240 can be retrieved and stored within the STA. For other embodiments, the APLS 240 may be omitted.

The STA may be any suitable Wi-Fi enabled wireless device including, for example, a cell phone, PDA, tablet computer, laptop computer, or the like. For the embodiments described herein, the STA may include radio frequency (RF) ranging circuitry (e.g., formed using well-known software modules, hardware components, and/or a suitable combination thereof) that can be used to estimate the distance between itself and one or more visible access points and/or other STAs using suitable ranging techniques. For example, the STA can use received signal strength indicator (RSSI) and/or round trip time (RTT) techniques to estimate the distance between itself and the access points AP1-AP3 or other STAs, for example, by correlating each RSSI or RTT value with a distance. In addition, the STA may include a local memory that stores a cache of Wi-Fi access point location data, and includes a processor that may execute WLAN positioning software, ranging software, APLS data retrieval software, transmit chain selection software, and/or CSD compensation software, as described in more detail below.

Figure 3:
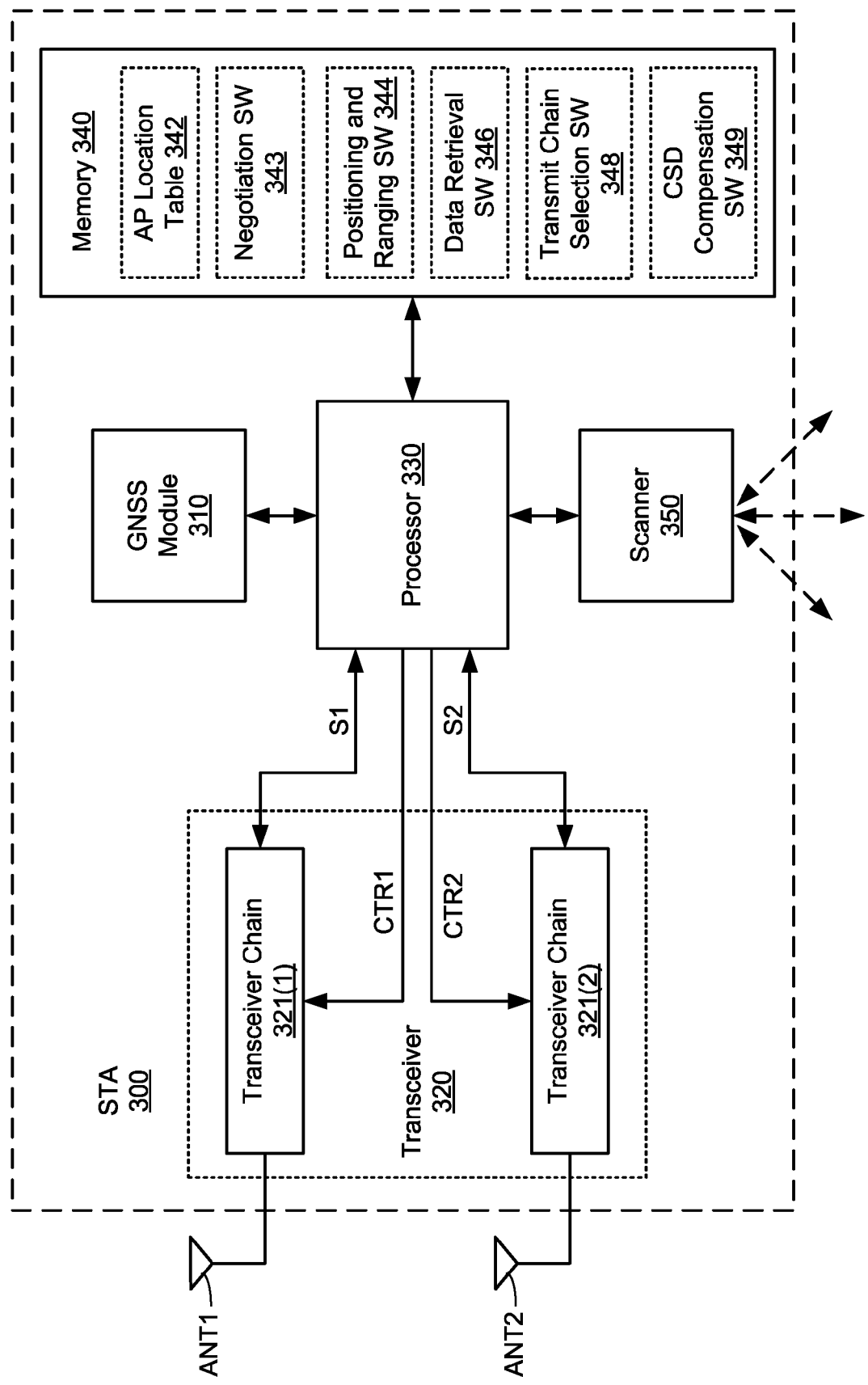
FIG. 3 is a block diagram of a mobile station (STA) in accordance with some embodiments.

FIG. 3 shows a STA 300 that is one embodiment of the STA of FIG. 2. The STA 300 includes a global navigation satellite system (GNSS) module 310, a transceiver circuit 320, a processor 330, a memory 340, a scanner 350, a first antenna ANT1, and a second antenna ANT2. The transceiver circuit 320 may be used to transmit signals to and receive signals from access points AP1-AP3, other STAs, and/or APLS 240 (see also FIG. 2). Scanner 350, which is well-known, may be used to scan the surrounding environment to detect and identify nearby access points (e.g., access points within range of STA 300) and/or other STAs. For some embodiments, the scanner 350 can search for nearby access points by periodically transmitting MAC address request frames. An AP or STA within range of STA 300 receives one or more of the requests and responds by transmitting its MAC address to the STA 300. If the STA 300 has line-of-sight with a suitable number (e.g., 3 or more) of navigation satellites, the GNSS module 310 can determine the current location of the STA 300 using triangulation techniques, and can then provide the location information to processor 330 for storage in memory 340.

For the exemplary embodiment of FIG. 3, transceiver circuit 320 is shown to include a first transceiver chain 321(1) and a second transceiver chain 321(2). The first transceiver chain 321(1), which is coupled between processor 330 and first antenna ANT1, is to exchange first signals (S1) with processor 330. The second transceiver chain 321(2), which is coupled between processor 330 and second antenna ANT2, is to exchange second signals (S2) with processor 330. Transceiver circuit 320 is depicted in FIG. 3 as including only two transceiver chains 321(1)-321(2) coupled to two antennas ANT1-ANT2 for simplicity only; for other embodiments, transceiver circuit 320 may include any suitable number of transceiver chains 321, and may be coupled to any suitable number of antennas (e.g., to enable more robust MIMO operations).

In operation, the first transceiver chain 321(1) may control the transmission and reception of the first signals S1 via first antenna ANT1, and the second transceiver chain 321(2) may control the transmission and reception of the second signals S2 via the second antenna ANT2. More specifically, first transceiver chain 321(1) may include a first transmit chain to process and then transmit signals generated by processor 330 to another wireless device or access point (not shown for simplicity) via first antenna ANT1, and may include a first receive chain to process and then forward signals received from first antenna ANT1 to processor 330. Similarly, second transceiver chain 321(2) may include a second transmit chain to process and then transmit signals generated by processor 330 to another wireless device or access point (not shown for simplicity) via second antenna ANT2, and may include a second receive chain to process and then forward signals received from second antenna ANT2 to processor 330. For some embodiments, the first and second transceiver chains 321(1)-321(2) may operate as half-duplex transceivers, thereby allowing the transmit and receive circuitry within each of transceiver chains 321(1)-321(2) to share a common antenna. For other embodiments, the transmit and receive circuitry (not shown in FIG. 3 for simplicity) within each of transceiver chains 321(1)-321(2) may be connected to its own dedicated antenna (e.g., to allow for full duplex operation).

For at least some embodiments, the processor 330 may generate controls signals CTR1 and CTR2, which in turn may be used to selectively enable and disable transceiver chains 321(1) and 321(2), respectively. The control signals CTR1 and CTR2 may be used, for example, to ensure that the STA 300 transmits frames associated with ranging operations using a single one of transceiver chains 321(1) or 321(2), as described in more detail below.

Memory 340 may include an AP location table 342 that can be used as a local cache to store the MAC addresses of a plurality of APs, the location coordinates of such APs, and other suitable location or configuration information of the APs. For some embodiments, each entry of the AP location table 342 includes an access point field to store the name of the associated AP, a BSSID field to store the MAC address of the AP, a coordinate field to store the location coordinates of the AP, and an uncertainty field to store a location uncertainty value for the AP.

Figure 6:
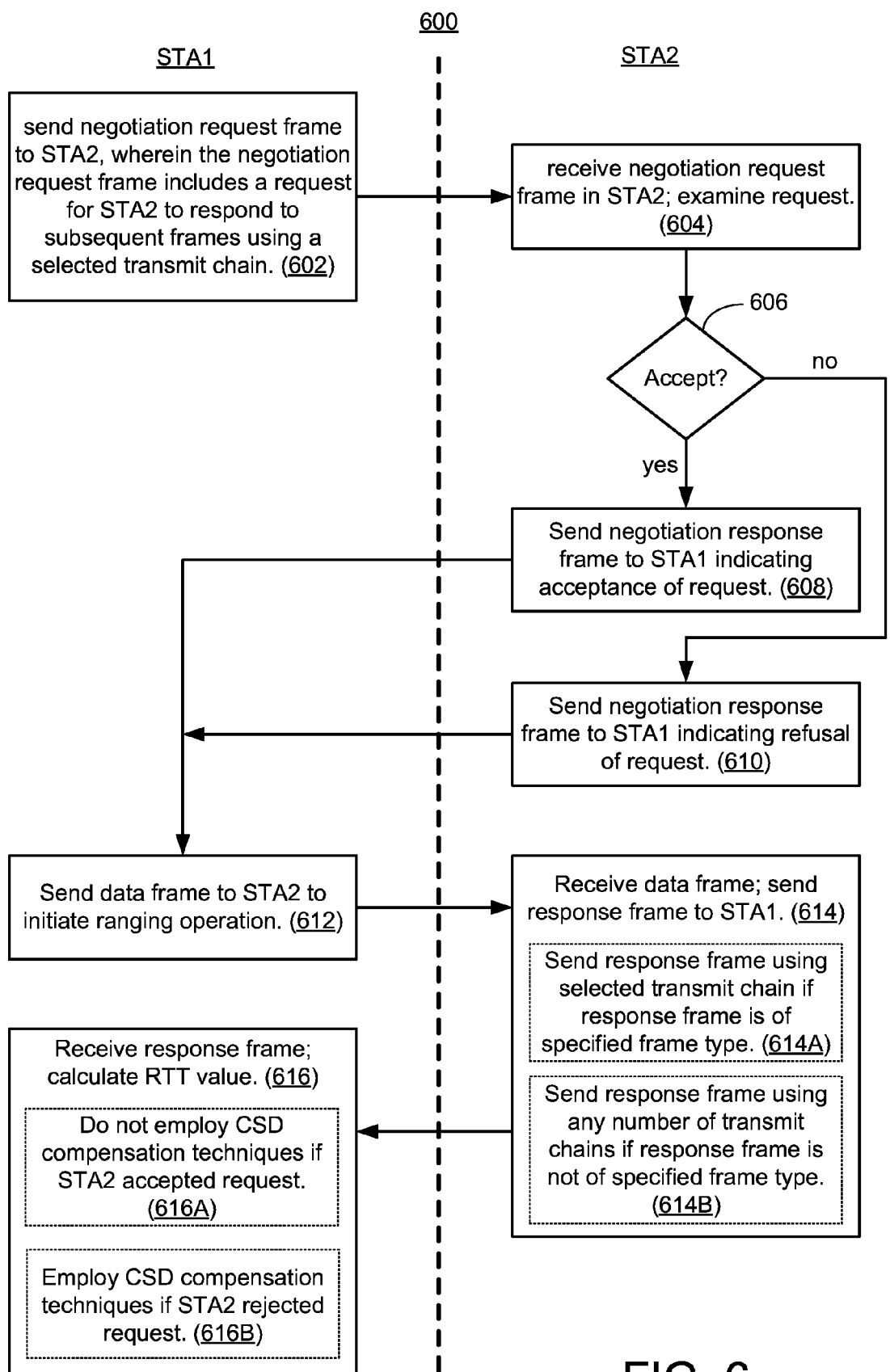
FIG. 6 shows an illustrative flowchart depicting ranging operations performed by two wireless devices in accordance with the present embodiments.

Memory 340 may also include a non-transitory computer-readable medium (e.g., one or more nonvolatile memory elements, such as EPROM, EEPROM, Flash memory, a hard drive, and so on) that can store one or more of the following software modules:

- a negotiation software module 343 to negotiate the use of a single transmit chain during ranging operations (e.g., as described for operations 602, 604, 606, 608, and 610 of FIG. 6);
- a positioning and ranging software module 344 to determine the location of the STA 300 based on locations of APs and/or other STAs using, for example, trilateration techniques and/or to enable ranging operations with one or more APs of a corresponding WLAN and/or with other STAs to estimate distances (e.g., as described for operations 612, 614, and 616 of FIG. 6);
- a data retrieval software module 346 to query the APLS 240 for access point information;
- a transmit chain selection software module 348 to use a specific single transmit chain to send one or more frames of a specified type to another wireless device (e.g., during a ranging operation) and to use any number of transmit chains to send other frames (e.g., not of the specified type) to another wireless device (e.g., as described for operations 614A and 614B of FIG. 6). For some embodiments, the transmit chain selection software module 348 may control the generation of control signals CTR1 and CTR2; and a CSD compensation software module 349 to compensate for the introduction of CSD in the transmit chains of the other wireless device (e.g., as described for operations 616A and 616B of FIG. 6).

Each software module includes instructions that, when executed by processor 330, can cause the STA 300 to perform the corresponding functions. Thus, the non-transitory computer-readable medium of memory 340 can include instructions for performing all or a portion of the operations of method 600 of FIG. 6.

Processor 330, which is coupled to transceiver circuit 320, GNSS module 310, memory 340, and scanner 350, can be any suitable processor capable of executing scripts or instructions of one or more software programs stored in the STA 300 (e.g., within memory 340). For example, processor 330 may execute negotiation software module 343, WLAN positioning and ranging software module 344, data retrieval software module 346, transmit chain selection software module 348, and/or CSD compensation software 349. The negotiation software module 343 may be executed by processor 330 to negotiate single chain ranging operations. The positioning and ranging software module 344 may be executed by processor 330 to perform ranging operations between the STA 300 and another wireless device (e.g., an AP or another STA) using RSSI and/or RTT techniques.

The data retrieval software module 346 may be executed by processor 330 to retrieve the location coordinates of one or more APs of interest from the APLS 240, and to provide such location coordinates to AP location table 342 for storage and/or to positioning and ranging software module 344 for determining the location of the STA 300.

The transmit chain selection software module 348 may be executed by processor 330 to cause the STA 300 to use a specific single transmit chain to send one or more frames of a specified type to another wireless device (e.g., during a ranging operation) and to use any number of transmit chains to send other frames (e.g., not of the specified type) to another wireless device. By using only one transceiver chain in STA 300 during the ranging operation, the adverse effects of CSD upon measured TOA values of received frames may be avoided, as described in more detail below.

The CSD compensation software module 349 may be executed by processor 330 to cause the STA 300 to compensate for the introduction of CSD in the transmit chains of the other wireless device if multiple transmit chains are used in the other wireless device.

Figure 4:
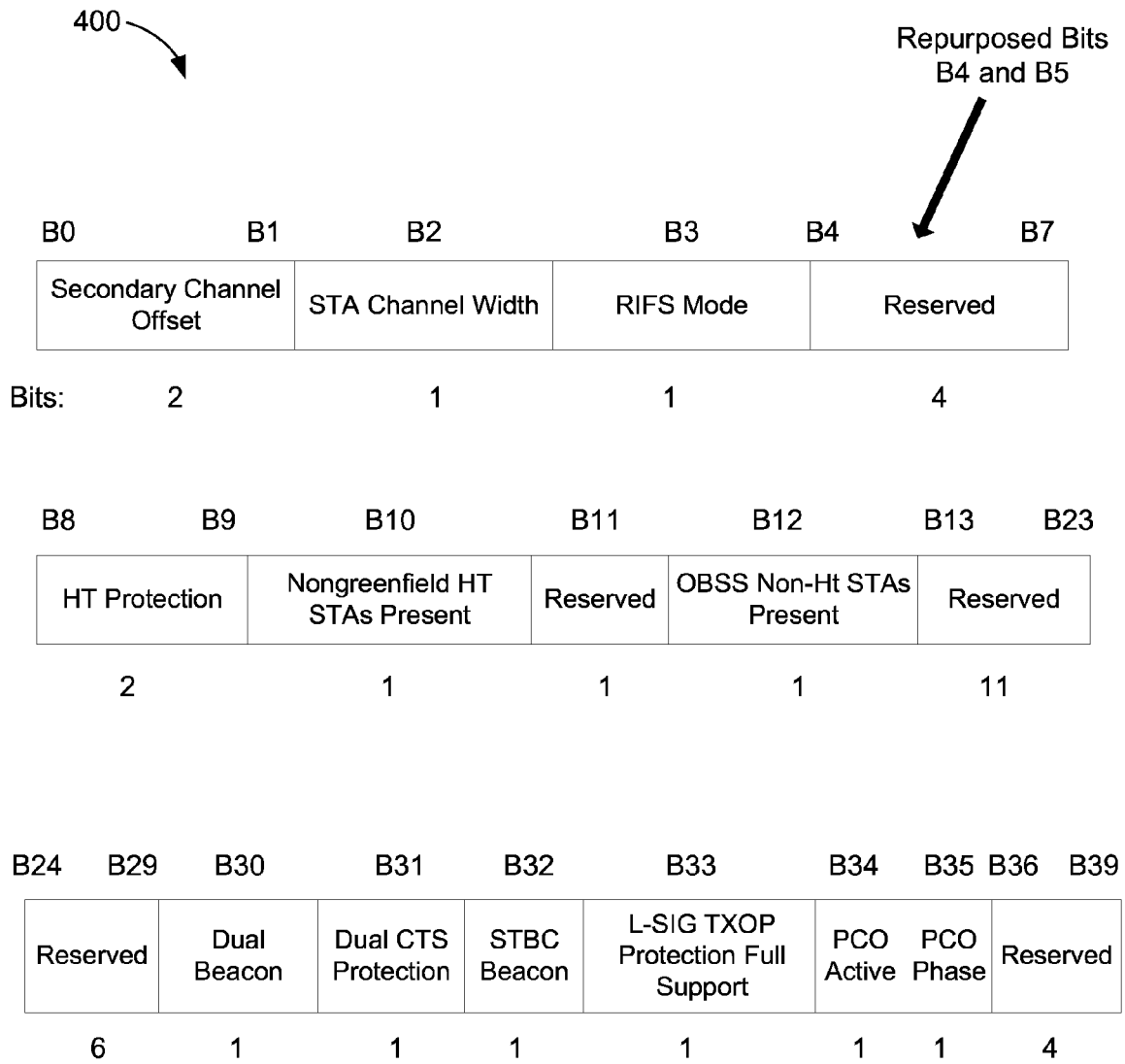
FIG. 4 depicts reserved data bits in data frames to request use of single transmit chains during ranging operations in accordance with some embodiments.

For some embodiments, during a negotiation phase, STA 300 may use one or more reserved bits of an existing 802.11 action frame sent to another wireless device to request the other wireless device to use a single transceiver chain for sending subsequent frames of a specified type (e.g., associated with ranging operations) and/or to accept such a request from other wireless devices. For example, FIG. 4 depicts an information element (IE) structure 400 of the operational mode for high throughput/very high throughput (HT/VHT) communications in accordance with the IEEE 802.11 standards. For at least some embodiments, the Reserved Bits B4 and B5 of the IE structure 400 may be provided within a negotiation request frame and used to request the other wireless device to transmit frames of a specified type using a single transmit chain and/or to accept such requests. For other embodiments, other reserved bits of the IE structure 400 may be used to request use of a single transmit chain for transmitting frames of the specified type and/or to accept such requests. For still other embodiments, a new 802.11 action frame may be defined and used to request use of a single transmit chain for transmitting frames of the specified type and/or to accept such requests.

More specifically, STA 300 may request another wireless device to respond to a frame received from STA 300 by transmitting a response frame using only one of its transmit chains, for example, by asserting bit B4 (e.g., to logic high) in the negotiation request frame's IE structure 400, and may allow the other wireless device to transmit the response frame using any number of its transmit chains by de-asserting bit B4 (e.g., to logic low) of the negotiation request frame's IE structure 400. The other wireless device may accept the request to use a single transmit chain by sending a negotiation response frame having an asserted Bit B5, and may reject the request to use a single transmit chain by sending a negotiation response frame having a de-asserted Bit B5. Thus, although FIG. 4 depicts the negotiation request frame as the IE structure 400 of a HT/VHT operational mode action frame, any suitable frame may contain the request to use a single transmit chain to send frames of the specified frame type. Similarly, although FIG. 4 depicts the negotiation response frame as the IE structure 400 of a HT/VHT operational mode action frame, any suitable frame may indicate acceptance of the request. For example, for other embodiments, a new action frame compliant with the IEEE 802.11 standards may be defined and used as the negotiation request frame and/or as the negotiation response frame As mentioned above, post processing operations that compensate for the effects of CSD during ranging operations between two wireless devices may be avoided by using a single transmit chain to transmit frames that are to be used to determine RTT values for ranging. The negotiation request frame sent by the requesting device (e.g., to request response frames of a specified type to be sent using a single transmit chain) may be any suitable frame such as, for example, a new REQUEST action frame, or an overloaded existing action frame (e.g., the HT/VHT Operational Mode action frame defined by the IEEE 802.11 standards). Similarly, the negotiation response frame sent by the responding device (e.g., to accept the request to use a single transmit chain) may be any suitable frame such as, for example, a new RESPONSE action frame, or an overloaded existing action frame, (e.g., the HT/VHT Operational Mode action frame defined by the IEEE 802.11 standards).

For some embodiments, the request may identify the specified frame type (e.g., ACK and block-ACK frames) to be transmitted from the responding device using a single transmit frame and/or may identify which of the transmit chains the responding device is to use when sending frames of the specified type; other frames (e.g., frames not of the specified type) may be transmitted from the responding device using multiple transmit chains even while the request from the first wireless device is valid. Further, as mentioned above, the request may also identify the selected one of the transmit chains to be used by the other wireless device, and/or may indicate a time duration or a number of frames of the specified type that are to be sent by the other wireless device.

Figure 5:
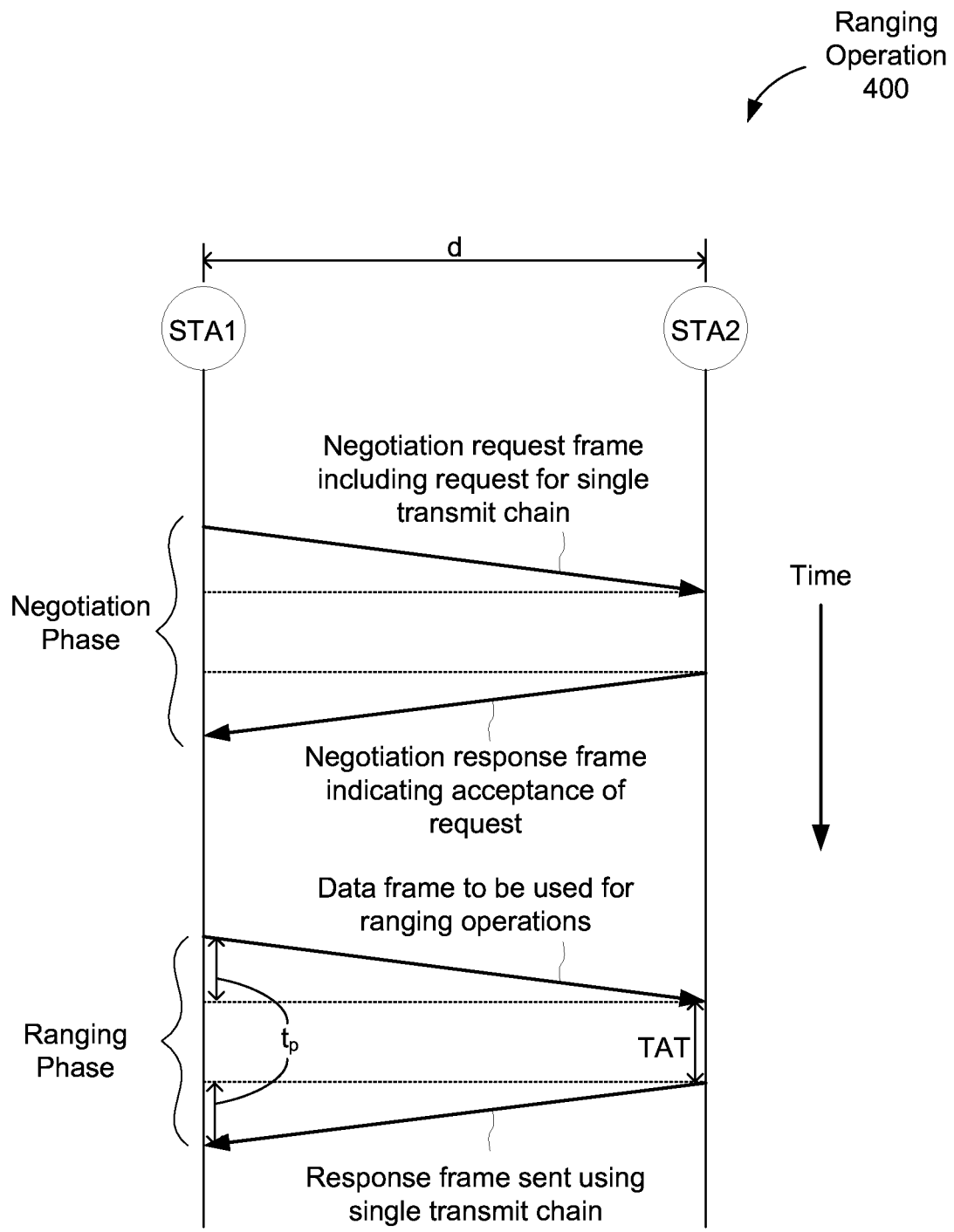
FIG. 5 is a sequence diagram depicting a RTT ranging operation in accordance with some embodiments.

FIG. 5 depicts an exemplary ranging operation 500 performed by first and second wireless stations STA1 and STA2 in accordance with some embodiments. For purposes of discussion herein, STA1 may be referred to as the requesting device, and STA2 may be referred to as the responding device. For some embodiments, STA1 and STA2 may be embodiments of STA 300 of FIG. 3. However, STA1 and STA2 may be any suitable wireless device including, for example, a mobile device (e.g., a smart phone or tablet computer) or a stationary device (e.g., a wireless access point or other ranging device). Thus, although described below in the context of two stations STA1 and STA2, the ranging operation 500 described below may be performed between a STA and an AP, between two APs, or between any number of suitable wireless devices.

Referring also to the illustrative flow chart 600 of FIG. 6, the requesting device STA1 initiates a negotiation phase of the ranging operation by sending a negotiation request frame, overloaded over an existing action frame, such as the HT/VHT Operational Mode action frame, to the responding device STA2, wherein the negotiation request frame includes a first bit (e.g., reserved bit B4 of the negotiation request frame's IE structure 400) that may selectively request STA2 to respond to subsequent frames sent from STA1 using a selected one of the transmit chains within STA2 (602). For example, STA1 may request STA2 to respond to subsequent frames sent from STA1 using a selected one of STA2's transmit chains by asserting (e.g., to logic high) the first bit within the negotiation request frame, overloaded over an existing action frame, such as the HT/VHT Operational Mode action frame, and STA1 may allow STA2 to respond to the subsequent frames sent from STA1 using any number of STA2's transmit chains by de-asserting (e.g., to logic low) the first bit within the negotiation request frame. For some embodiments, the request sent by STA1 may identify the specified frame type for which STA2 is to send using the selected one of its transmit chains and/or may identify the selected one of the transmit chains to be used by STA2. For example, if the request identifies ACK and block-ACK frames as the specified frame types, then after acceptance of the request, STA2 is to transmit all subsequent ACK and block-ACK frames using the selected one of its transmit chains. In yet another embodiment, a new Action frame may be defined and used to conduct the REQUEST and RESPONSE negotiation phase, instead of overloading an existing action frame.

STA2 receives the negotiation request frame, and examines the request (e.g., the first bit) therein to determine whether STA1 is requesting STA2 to use a single transmit chain when transmitting frames of the specified type (604). If STA1 does not request STA2 to use a single transmit chain to transmit frames of the specified type (e.g., the first data bit is de-asserted), then STA2 may send subsequent response frames using any number of its transmit chains. However, if STA1 requests STA2 to use a single transmit chain when transmitting frames of the specified type (e.g., the first data bit of the first frame is asserted), then STA2 determines whether to accept STA1's request (606).

If STA2 accepts STA1's request to use a single transmit chain, as tested at 606, then STA2 may indicate acceptance by asserting a second bit (e.g., reserved bit B5 of the IE structure 400) of a negotiation response frame and then send the negotiation response frame to STA1 (608). Conversely, if STA2 does not accept STA1's request to use a single transmit chain, as tested at 606, then STA2 may indicate refusal by de-asserting the second bit (e.g., reserved bit B5 of the IE structure 400) of the negotiation response frame and then send the negotiation response frame to STA1 (610).

As mentioned above, the negotiation request frame may be any suitable frame such as, for example, a data frame, a REQ frame, a management frame, and/or a measurement frame transmitted according to the IEEE 802.11 standards. Similarly, the negotiation response frame may be any suitable frame such as, for example, a data frame, an ACK frame, a management frame, and/or a measurement frame transmitted according to the IEEE 802.11 standards.

STA1 receives the negotiation response frame from STA1, and then initiates a ranging phase of the ranging operation by sending a data frame to STA2 (612). STA2 receives the data frame from STA1, and responds by sending a response frame to STA1 (614). If the response frame is of the specified frame type, then STA2 transmits the response frame to STA1 using the selected one of its transmit chains (614A). Conversely, if the response frame is not of the specified frame type, then STA2 may transmit the response frame to STA1 using any number of its transmit chains (614B). For the example of FIG. 5, the response frame is of the specified frame type (e.g., the response frame is an ACK frame or block-ACK frame identified in the negotiation request frame), and therefore STA2 sends the response frame to STA1 using the selected one of its transmit chains.

STA1 receives the response frame sent from STA2, and may thereafter calculate the RTT value of the data frame and the response frame (616). More specifically, if STA2 accepted the request to use a single transmit chain when transmitting frames of the specified type (608), then STA1 may calculate the RTT value(s) of the data frame and the response frame without employing CSD compensation techniques (616A). Because STA2 sends the response frame to STA1 using a single transmit chain, the TOA of the response frame (as measured by STA1) may not suffer from CSD introduced by STA2. In this manner, STA1 may request and perform ranging operations using a single transmit chain in STA2.

Conversely, if STA2 rejected the request to use a single transmit chain to transmit frames of the specified type (610), then STA1 may calculate the RTT value(s) of the data frame and the response frame while employing CSD compensation techniques to selectively adjust the measured TOA value(s) of the received frame(s). More specifically, because STA2 may send the response frame to STA1 using more than one transmit chain, the TOA value(s) of such frames (as measured by STA1) may suffer from CSD introduced by STA2, and therefore STA1 may employ CSD compensation techniques (e.g., by executing CSD compensation software module 349 of FIG. 3) to adjust the TOA value(s) of the received frames.

Note that if STA2 accepts the request to send frames of the specified type using only the selected one of its transmit chains, then STA2 may transmit such frames using only one transmit chain for a predetermined period of time, until one or more conditions are met, until the request is canceled, and/or for other suitable reasons. For one example, STA2 may send subsequent frames of the specified type to STA1 using only the selected transmit chain for a predetermined time period after accepting the request. For another example, STA2 may send a predetermined number of subsequent frames of the specified type to STA1 using only the selected transmit chain. For still another example, STA2 may send subsequent frames of the specified type to STA1 using only the selected transmit chain until STA2 receives an instruction canceling the request.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, method steps depicted in the flow chart of FIG. 6 may be performed in other suitable orders and/or one or more method steps may be omitted.

What is claimed is:

1. A method of performing a ranging operation between a first wireless device and a second wireless device, the second wireless device including a plurality of transmit chains, wherein the method comprises:

during a negotiation phase:
receiving a negotiation request frame from the first wireless device, wherein the negotiation request frame includes a request for the second wireless device to respond to subsequent frames sent from the first wireless device using a selected one of the transmit chains in the second wireless device; and sending a negotiation response frame from the second wireless device to the first wireless device, wherein the negotiation response frame indicates whether the second wireless device accepts the request; and during a ranging phase:

receiving a data frame from the first wireless device; and
sending a response frame to the first wireless device in response to receiving the data frame.

2. The method of claim 1, wherein:
the response frame is to be transmitted using the selected one of the transmit chains in the second wireless device if the response frame is of a specified frame type; and
the response frame is to be transmitted using any number of the transmit chains in the second wireless device if the response frame is not of the specified frame type.

3. The method of claim 2, wherein the request identifies the specified frame type.

4. The method of claim 2, wherein the specified frame type comprises acknowledgement (ACK) frames.

5. The method of claim 1, wherein the negotiation request frame and the negotiation response frame comprise action frames.

6. The method of claim 1, wherein the request comprises a reserved bit embedded within the negotiation request frame, and the negotiation request frame comprises a high throughput/very high throughput (HT/VHT) operational mode action frame.

7. The method of claim 1, wherein the negotiation response frame includes a reserved bit indicating acceptance of the request.

8. The method of claim 1, wherein the request identifies the selected one of the transmit chains in the second wireless device.

9. The method of claim 1, further comprising:
if the request is accepted, calculating a round trip time (RTT) value of the data frame and the response frame without employing a cyclic shift diversity (CSD) compensation operation; and
if the request is not accepted, calculating the RTT value of the data frame and the response frame by employing the CSD compensation operation.

10. The method of claim 1, further comprising:
asserting a reserved bit in the negotiation response frame if the second wireless device accepts the request; and
de-asserting the reserved bit in the negotiation response frame if the second wireless device does not accept the request.

11. The method of claim 1, wherein the second wireless device, upon accepting the request, is to send frames of the specified frame type using the selected one of the transmit chains for a predetermined time period.

12. The method of claim 1, wherein the second wireless device, upon accepting the request, is to send a predetermined number of frames of the specified frame type using the selected one of the transmit chains.

13. The method of claim 1, wherein the second wireless device, upon accepting the request, is to send frames of the specified frame type using the selected one of the transmit chains until the second wireless device receives an instruction canceling the request.

14. A non-transitory computer-readable medium containing program instructions that, when executed by a processor of a second wireless device including a plurality of transmit chains during a ranging operation with a first wireless device, cause the second wireless device to:
receive a negotiation request frame from the first wireless device, wherein the negotiation request frame includes a request for the second wireless device to respond to subsequent frames sent from the first wireless device using a selected one of the transmit chains in the second wireless device;
send a negotiation response frame from the second wireless device to the first wireless device, wherein the negotiation response frame indicates whether the second wireless device accepts the request;
receive a data frame from the first wireless device; and
send a response frame to the first wireless device in response to receiving the data frame.

15. The non-transitory computer-readable medium of claim 14, wherein:
the response frame is to be transmitted using the selected one of the transmit chains in the second wireless device if the response frame is of a specified frame type; and
the response frame is to be transmitted using any number of the transmit chains in the second wireless device if the response frame is not of the specified frame type.

16. The non-transitory computer-readable medium of claim 15, wherein the request identifies the specified frame type.

17. The non-transitory computer-readable medium of claim 15, wherein the specified frame type comprises acknowledgement (ACK) frames.

18. The non-transitory computer-readable medium of claim 14, wherein the negotiation request frame and the negotiation response frame comprise action frames.

19. The non-transitory computer-readable medium of claim 14, wherein the request comprises a reserved bit embedded within the negotiation request frame, and the negotiation request frame comprises a high throughput/very high throughput (HT/VHT) operational mode action frame.

20. The non-transitory computer-readable medium of claim 14, wherein the negotiation response frame includes a reserved bit indicating acceptance of the request.

21. The non-transitory computer-readable medium of claim 14, wherein the request identifies the selected one of the transmit chains in the second wireless device.

22. The non-transitory computer-readable medium of claim 14, wherein execution of the program instructions further causes the second wireless device to:
assert a reserved bit in the negotiation response frame if the second wireless device accepts the request; and
de-assert the reserved bit in the negotiation response frame if the second wireless device does not accept the request.

23. The non-transitory computer-readable medium of claim 14, wherein the second wireless device, upon accepting the request, is to send frames of the specified frame type using the selected one of the transmit chains for a predetermined time period.

24. The non-transitory computer-readable medium of claim 14, wherein the second wireless device, upon accepting the request, is to send a predetermined number of frames of the specified frame type using the selected one of the transmit chains.

25. The non-transitory computer-readable medium of claim 14, wherein the second wireless device, upon accepting the request, is to send frames of the specified frame type using the selected one of the transmit chains until the second wireless device receives an instruction canceling the request.

26. A wireless device, comprising:
a plurality of transmit chains;
a processor; and
a memory storing instructions that, when executed by the processor, cause the wireless device to:
receive a negotiation request frame from another device, wherein the negotiation request frame includes a request for the wireless device to respond to subsequent frames sent from the other device using a selected one of the transmit chains in the wireless device;
send a negotiation response frame from the wireless device to the other device, wherein the negotiation response frame indicates whether the wireless device accepts the request;
receive a data frame from the other device; and
send a response frame to the other device in response to receiving the data frame.

27. The wireless device of claim 26, wherein:
the response frame is to be transmitted using the selected one of the transmit chains in the wireless device if the response frame is of a specified frame type; and
the response frame is to be transmitted using any number of the transmit chains in the wireless device if the response frame is not of the specified frame type.

28. The wireless device of claim 27, wherein the request identifies the specified frame type.

29. The wireless device of claim 27, wherein the specified frame type comprises acknowledgement (ACK) frames.

30. The wireless device of claim 26, wherein the negotiation request frame and the negotiation response frame comprise action frames.

31. The wireless device of claim 26, wherein the request comprises a reserved bit embedded within the negotiation request frame, and the negotiation request frame comprises a high throughput/very high throughput (HT/VHT) operational mode action frame.

32. The wireless device of claim 26, wherein the negotiation response frame includes a reserved bit indicating acceptance of the request.

33. The wireless device of claim 26, wherein the request identifies the selected one of the transmit chains in the wireless device.

34. The wireless device of claim 26, wherein execution of the instructions by the processor causes the wireless device to further:
assert a reserved bit in the negotiation response frame if the wireless device accepts the request; and
de-assert the reserved bit in the negotiation response frame if the wireless device does not accept the request.

35. The wireless device of claim 26, wherein the wireless device, upon accepting the request, is to send frames of the specified frame type using the selected one of the transmit chains for a predetermined time period.

36. The wireless device of claim 26, wherein the wireless device, upon accepting the request, is to send a predetermined number of frames of the specified frame type using the selected one of the transmit chains.

37. The wireless device of claim 26, wherein the wireless device, upon accepting the request, is to send frames of the specified frame type using the selected one of the transmit chains until the wireless device receives an instruction canceling the request.

38. A wireless device, including a plurality of transmit chains, for performing a ranging operation with another device, the wireless device comprising:
means for receiving a negotiation request frame from the other device, wherein the negotiation request frame includes a request for the wireless device to respond to subsequent frames sent from the other device using a selected one of the transmit chains in the wireless device;
means for sending a negotiation response frame from the wireless device to the other device, wherein the negotiation response frame indicates whether the wireless device accepts the request; and
means for receiving a data frame from the other device; and
means for sending a response frame to the other device in response to receiving the data frame.

39. The wireless device of claim 38, wherein:
the response frame is to be transmitted using the selected one of the transmit chains in the wireless device if the response frame is of a specified frame type; and
the response frame is to be transmitted using any number of the transmit chains in the wireless device if the response frame is not of the specified frame type.

40. The wireless device of claim 39, wherein the request identifies the specified frame type.

41. The wireless device of claim 39, wherein the specified frame type comprises acknowledgement (ACK) frames.

42. The wireless device of claim 38, wherein the negotiation request frame and the negotiation response frame comprise action frames.

43. The wireless device of claim 38, wherein the request comprises a reserved bit embedded within the negotiation request frame, and the negotiation request frame comprises a high throughput/very high throughput (HT/VHT) operational mode action frame.

44. The wireless device of claim 38, wherein the request identifies the selected one of the transmit chains in the wireless device.

45. The wireless device of claim 38, wherein the wireless device, upon accepting the request, is to send frames of the specified frame type using the selected one of the transmit chains for a predetermined time period.

46. The wireless device of claim 38, wherein the wireless device, upon accepting the request, is to send a predetermined number of frames of the specified frame type using the selected one of the transmit chains.

47. The wireless device of claim 38, wherein the wireless device, upon accepting the request, is to send frames of the specified frame type using the selected one of the transmit chains until the wireless device receives an instruction canceling the request.

* * * * *